Oct. 8, 1968
C. S. SCANLEY
3,405,106
POLYMERIZATION OF WATER SOLUBLE VINYL MONOMERS
IN PRESENCE OF METAL SALTS
Filed June 29, 1964
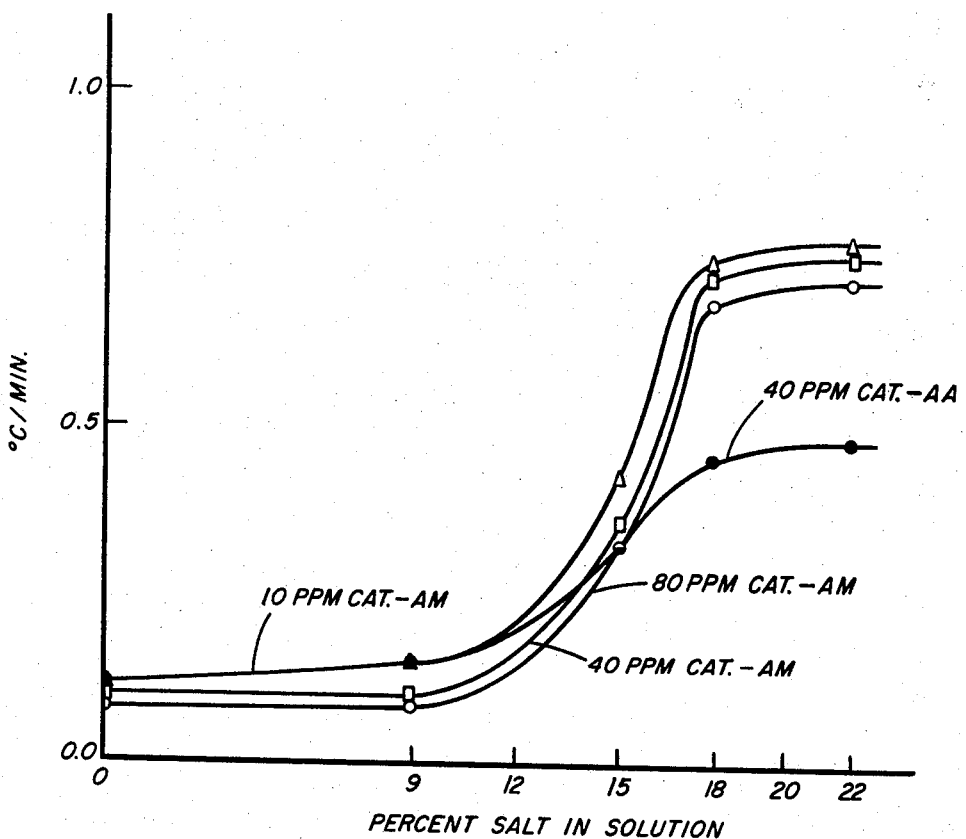
INVENTOR.
CLYDE S. SCANLEY
BY
ATTORNEY United States Patent Office 3,405,106
Patented Oct. 8, 1968

3,405,106
POLYMERIZATION OF WATER SOLUBLE VINYL MONOMERS IN PRESENCE OF METAL SALTS
Clyde Stephen Scanley, Stamford, Conn., assignor to American Cyanamid Company, Stamford, Conn., a corporation of Maine
Filed June 29, 1964, Ser. No. 378,657
6 Claims. (Cl. 260—80)

This invention relates to a process for the polymerization of water-soluble monomers. More particularly, this invention relates to a novel process for increasing the polymerization rate of water-soluble monomers. Still more particularly, this invention relates to a process for the polymerization of water-soluble monomers which comprises reacting an aqueous solution of a water-soluble monomer in the presence of a polymerization catalyst and a water-soluble neutral alkali or alkaline-earth metal salt in an amount ranging from about 9%, by weight, based on total reaction mixture, to about the saturation point of the salt in the monomer solution.

Various procedures for the aqueous solution polymerization of water-soluble monomers have been set forth in the art. While relatively high molecular weight materials are produced acording to these known procedures, generally, the rate of polymerization is very slow and therefore increased costs of production and equipment, as well as increased time consumption, occur. I have now found a polymerization procedure which can be conducted at an increased rate of polymerization to yield products having molecular weights as high as those of the prior art methods. That is to say, by the utilization of my novel procedure, the rate of polymerization of water-soluble monomers is materially increased at no detriment to the molecular weight of the polymer which is produced.

It is therefore an object of the present invention to provide a novel method for the solution polymerization of water-soluble monomers.

It is a further object of the present invention to provide a novel process for the aqueous solution polymerization of water-soluble monomers which comprises conducting the polymerization in the presence of a water-soluble neutral alkali metal or alkaline-earth metal salt in an amount ranging from about 9%, based on the total reaction media, to about the saturation point of the salt in the monomer solution.

These and other objects will become more apparent to one skilled in the art upon reading the more detailed description of the present invention set forth hereinbelow.

According to the instant process, any water-soluble monomer can be homopolymerized or copolymerized at an accelerated rate of polymerization to a high molecular weight homopolymer or copolymer. Examples of such monomers, which may be used, alone or in admixture with one another, include the acrylamides such as acrylamide, methacrylamide, the dialkylaminoalkyl acrylamides, such as dimethylaminoethyl acrylamide and methacrylamide, the acrylic acids such as acrylic acid and methacrylic acid, various dialkylaminoalkyl acrylates, such as dimethylaminoethyl acrylate, dimethylaminoethyl methacrylate, vinyl pyridine, methyl vinyl pyridine, vinyl pyrrolidone, various amino styrenes such as p-dimethylaminomethyl styrene, compounds such as vinyl sulfuric acid, diallyl dimethyl ammonium chloride, trimethyl ammonium ethyl acrylate (chloride) and the like. The polyemrization is conducted in aqueous solutions of the monomer in concentrations ranging from about 1% to about 25% of monomer solids, preferably about 5% to about 20%, at a temperature ranging from about 0° C. to 100° C., preferably 5° C. to 30° C., and preferably at atmospheric pressure. Subatmospheric and superatmospheric temperatures may be used however, without detracting from the advantageous results specified above.

Various catalyst systems, all of which are known in the art, may be employed. Examples of such catalyst systems include tertiary butyl hydroperoxide, ditertiary butyl peroxide, benzoyl peroxide, hydrogen peroxide, ammonium peroxide, potassium peroxide, ammonium persulfate, potassium persulfate, sodium persulfate, sodium perborate, potassium perborate, ammonium perborate, peracetic acid, sodium percarbonate, potassium percarbonate, ammonium percarbonate, and the like.

Redox systems may also be used wherein an oxygen containing compound and a reducing agent are used. Examples of such catalysts include mixtures of sodium persulfate and potassium bisulfite, potassium persulfate and potassium bisulfite, potassium persulfate and sodium bisulfite, ammonium persulfate and sodium thiosulfate and the like. The catalysts may be utilized in conventional catalytic amounts such as from about 0.0001% to about 0.5% or even as high as 1.0%, preferably about 0.001% to about 0.3%, by weight, based on the weight of the total reaction media, i.e. the water, monomer, catalyst and salt.

The molecular weight of the polymers produced according to the process of the present invention may vary from about 25,000 to 50,000 as a lower value or as high as 5, 10, or 20,000,000 as determined by the intrinsic viscosity of the polymer per se at about 25° C. in 1 N sodium chloride as a pH of 8. The molecular weights may also be determined by the light scattering technique as outlined in the "Principles of Polymer Chemistry," P. J. Flory, Cornell University Press, 1953, pages 256–316.

Various chain-regulating or chain transfer agents may also be added to the reaction media during the polymerization of the water-soluble monomers according to the present invention. When such an agent is present, it is preferably kept within the range of from about 0.01% to about 100%, by weight, based on the total weight of the monomeric materials present. Such compounds as water-soluble alcohols, e.g., methyl alcohol, ethyl alcohol, isopropyl alcohol and the like; mercaptans and their derivatives, e.g., thioglycol, thioglycolic acid, methylthioglycolate and the like, may be used for this purpose.

In certain instances, it may be desirable to utilize a mixture of monomeric materials as the charge to the process of the present invention. In the event that mixtures of this type are utilized, it should be noted that the second monomer should preferably be water-soluble also. In this regard, mixtures of the monomeric materials set forth hereinabove may be utilized or the monomers may be used in admixture with other partially water-soluble monomeric material copolymerizable therewith in relatively minor amounts, i.e. generally not more than about 25%, by weight, based on the total monomer charge.

The salts employed, as mentioned above, which form the crux of the present invention when used in certain critical amounts, are termed water-soluble, neutral, alkali metal or alkaline-earth metal salts. That is to say, I may use salts, of which, the cation is hydrated and which yield a neutral pH solution. Examples of salts which may be utilized are lithium chloride, sulfate, phosphate, and nitrate, sodium chloride, sulfate, phosphate, and nitrate, potassium chloride, sulfate, phosphate, and nitrate and the like. I may also use compounds such as magnesium chloride and nitrate, calcium chloride and nitrate, strontium chloride and nitrate, barium chloride and nitrate and the like.

The amount of salt employed is critical and the beneficial results set forth hereinabove are only attained when concentrations of salt ranging from about 9%, by weight, based on the total reaction media, i.e. water, monomer, catalyst, and salt, to about the saturation point of the salt in the monomer solution, preferably about 12% to 22%, by weight, same basis, are employed. Lower amounts are less effective and, for practical purposes, produce no increased benefits. Larger amounts of salt do not increase the benefits attained in that the rate of polymerization then remains constant. The only concern in regard to the salt selected is that it should be limited to one which will not react with the monomer being polymerized, i.e. is inert in regard to the polymerizable monomer.

The accompanying drawing specifies a graphic representation of the results achieved by the novel process constituting my invention. The figure depicts the effect of the addition of neutral salts according to my invention on the rate of polymerization of two monomers, acrylamide and acrylic acid. As the percent salt in the reaction media is increased to about 9%, the rate of polymerization (as measured by exotherm; ° C./min. at 34–44° C.) suddenly increases at a rapid rate regardless of the amount of catalyst employed. At about the saturation point of the salt, i.e. about 22%, the curve levels off indicating no further increase in the rate of polymerization. The results shown in the drawing were plotted from data obtained according to the examples set forth hereinbelow.

The resultant polymeric materials may be utilized for such applications as flocculating agents, settling agents, thickening agents and the like wherein waste products are removed from solution.

The following examples are set forth for purposes of illustration only and are not to be construed as limitations on the present invention. All parts and percentages are by weight unless otherwise specified.

Example 1

Into a suitable reaction vessel, equipped with thermometer, gas inlet and outlet, and catalyst and salt inlets, are added 27 parts of acrylamide, 210 parts of water and 54 parts of sodium sulfate, i.e. 18% of the reaction media. The system is purged of oxygen by injection of nitrogen gas at 30° C. To the reaction media is then added 0.012 part of nitrilotrispropionamide and 0.012 part of ammonium persulfate, each as a 4% aqueous solution, i.e. 40 parts per million of solid catalyst in the reaction media. The reaction vessel temperature rises to 60° C. and is maintained at 60° C. for 30 minutes. The rate of polymerization of the acrylamide is 0.74° C. per minute over the range of 34° C.–44° C. The percent conversion is 94% as determined by dialyzing and then drying the polymeric product solution to a final temperature of 110° C.

The results of Example 1 are set forth in Table I below, along with various other results obtained by varying the monomers, catalysts, salts and amounts thereof. The results of the acrylamide and acrylic acid polymerizations are plotted to the accompanying drawing.

| Run | Monomer | Catalyst | P.p.m. | Salt | Percent | Rate of Polymerization, ° C./min.[1] |
|---|---|---|---|---|---|---|
| 1 | AM | NTPA-APS | 10 | $Na_2SO_4$ | 18 | 0.75 |
| 2 | AM | NTPA-APS | 10 | $Na_2SO_4$ | 9 | 0.15 |
| 3 | AM | NTPA-APS | 10 | $Na_2SO_4$ | 15 | 0.43 |
| 4 | AM | NTPA-APS | 10 | $Na_2SO_4$ | 0 | 0.11 |
| 5 | AM | NTPA-APS | 10 | $Na_2SO_4$ | 22 | 0.76 |
| 6 | AM | NTPA-APS | 40 | $Na_2SO_4$ | 0 | 0.18 |
| 7 | AM | NTPA-APS | 40 | $Na_2SO_4$ | 9 | 0.09 |
| 8 | AM | NTPA-APS | 40 | $Na_2SO_4$ | 15 | 0.36 |
| 9 [2] | AM | NTPA-APS | 40 | $Na_2SO_4$ | 18 | 0.74 |
| 10 | AM | NTPA-APS | 40 | $Na_2SO_4$ | 22 | 0.75 |
| 11 | AM | NTPA-APS | 80 | $Na_2SO_4$ | 0 | 0.09 |
| 12 | AM | NTPA-APS | 80 | $Na_2SO_4$ | 9 | 0.09 |
| 13 | AM | NTPA-APS | 80 | $Na_2SO_4$ | 15 | 0.33 |
| 14 | AM | NTPA-APS | 80 | $Na_2SO_4$ | 18 | 0.69 |
| 15 | AM | NTPA-APS | 80 | $Na_2SO_4$ | 22 | 0.70 |
| 16 | AA | Peracetic Acid | 40 | $Na_2SO_4$ | 0 | 0.11 |
| 17 | AA | Peracetic Acid | 40 | $Na_2SO_4$ | 9 | 0.15 |
| 18 | AA | Peracetic Acid | 40 | $Na_2SO_4$ | 15 | 0.33 |
| 19 | AA | Peracetic Acid | 40 | $Na_2SO_4$ | 18 | 0.46 |
| 20 | AA | Peracetic Acid | 40 | $Na_2SO_4$ | 22 | 0.48 |
| 21 | MA | TBP | 80 | $MgCl_2$ | 0 | 0.12 |
| 22 | MA | TBP | 80 | $MgCl_2$ | 15 | 0.61 |
| 23 | DMAEA | DTBP | 40 | $LiNO_3$ | 0 | 0.14 |
| 24 | DMAEA | DTBP | 40 | $LiNO_3$ | 15 | 0.43 |
| 25 | VP | BP | 40 | NaCl | 0 | 0.11 |
| 26 | VP | BP | 40 | NaCl | 12 | 0.38 |
| 27 | DMAMS | SP-PB | 10 | $Ca(NO_3)_2$ | 0 | 0.09 |
| 28 | DMAMS | SP-PB | 10 | $Ca(NO_3)_2$ | 12 | 0.46 |
| 29 | AMAC | PP | 80 | $BaCl_2$ | 0 | 0.17 |
| 30 | AMAC | PP | 80 | $BaCl_2$ | 18 | 0.50 |

[1] Determined in 0.1% solution of polymer in 1N NaCl at pH of 8.0.
[2] Example 1.

Code for Table I

P.p.m.=parts per million; AM=acrylamide; NTPA=nitrilotrispropionamide; APS=ammonium persulfate; AA=acrylic acid; MA=methacrylic acid; TBP=tertiary butyl peroxide; DMAEA=dimethylaminoethyl acrylate; DTBP=ditertiary butyl peroxide; VP=vinyl pyridine; BP=benzoyl peroxide; DMAMS=p-Dimethylaminomethyl stryene; SP=sodium persulfate; PB=potassium bisulfite; AMAC=diallyldimethylammonium chloride; PP=potassium persulfate.

I claim:

1. In a process for the polymerization of a water-soluble vinyl monomer to a polymer of said monomer, wherein said monomer is reacted in an aqueous medium, at a temperature of from about 0° C. to about 100° C. and in the presence of from about 0.0001% to about 1.0%, by weight, based on the total weight of the reaction media, of a polymerization catalyst, the improvement which comprises conducting the reaction in the presence of a water-soluble neutral salt selected from the group consisting of alkali metal salts and alkaline earth metal salts, in an amount ranging from about 9%, by weight, based on the total weight of the reaction media, to about the saturation point of said salt in said reaction media.

2. A method according to claim 7 wherein said water-soluble monomer is acrylamide.

3. A method according to claim 7 wherein said water-soluble neutral salt is sodium sulfate.

4. A method according to claim 7 wherein said water-soluble monomer is acrylic acid.

5. A method according to claim 7 wherein said water-soluble neutral salt is an alkali metal salt of a hydratable cation.

6. A method according to claim 7 wherein said water-soluble neutral salt is an alkaline earth metal salt of a hydratable cation.

References Cited

UNITED STATES PATENTS

| | | | |
|---|---|---|---|
| 2,983,717 | 5/1961 | Henley et al. | 260—89.7 |
| 3,215,680 | 11/1965 | Kolodny | 260—89.7 |

FOREIGN PATENTS 26,792  1963  Japan.

JOSEPH L. SCHOFER, *Primary Examiner.*

W. F. HAMROCK, *Assistant Examiner.*